United States Patent
Jannink et al.

(10) Patent No.: US 6,697,800 B1
(45) Date of Patent: Feb. 24, 2004

(54) SYSTEM AND METHOD FOR DETERMINING AFFINITY USING OBJECTIVE AND SUBJECTIVE DATA

(75) Inventors: Jan F. Jannink, Menlo Park, CA (US); Thomas E. Schirmer, Mountain View, CA (US); Narayanan Shivakumar, Sunnyvale, CA (US)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/574,108

(22) Filed: May 19, 2000

(51) Int. Cl.[7] .............................................. G06F 17/30
(52) U.S. Cl. ........................................................ 707/5
(58) Field of Search .................... 707/1–10, 100–104.1; 704/9; 395/760

(56) References Cited

U.S. PATENT DOCUMENTS

| | | | | |
|---|---|---|---|---|
| 5,321,833 A | * | 6/1994 | Chang et al. .................... | 707/5 |
| 5,675,819 A | * | 10/1997 | Schuetze ...................... | 704/10 |
| 5,794,178 A | * | 8/1998 | Caid et al. ................... | 345/440 |
| 5,857,179 A | * | 1/1999 | Vaithyanathan et al. ........ | 707/2 |
| 5,872,850 A | * | 2/1999 | Klein et al. ..................... | 705/51 |
| 5,884,305 A | * | 3/1999 | Kleinberg et al. .............. | 707/1 |
| 5,913,205 A | * | 6/1999 | Jain et al. ........................ | 707/2 |
| 5,920,859 A | * | 7/1999 | Li ................................. | 707/10 |
| 5,970,464 A | * | 10/1999 | Apte et al. ...................... | 705/4 |
| 6,006,218 A | | 12/1999 | Breese et al. | |
| 6,006,221 A | * | 12/1999 | Liddy et al. .................... | 704/2 |
| 6,006,223 A | * | 12/1999 | Agrawal et al. ............. | 707/102 |
| 6,038,560 A | * | 3/2000 | Wical ........................... | 706/50 |
| 6,049,777 A | * | 4/2000 | Sheena et al. ................. | 705/10 |
| 6,092,049 A | * | 7/2000 | Chislenko et al. ............. | 705/10 |
| 6,212,494 B1 | * | 4/2001 | Boguraev ..................... | 704/10 |
| 6,233,575 B1 | * | 5/2001 | Agrawal et al. ................ | 707/6 |
| 6,308,172 B1 | * | 10/2001 | Agrawal et al. ................ | 704/4 |
| 6,317,722 B1 | * | 11/2001 | Jacobi et al. .................. | 705/14 |
| 6,366,910 B1 | * | 4/2002 | Rajaraman et al. ............ | 707/5 |
| 6,510,406 B1 | * | 1/2003 | Marchisio ...................... | 704/9 |

FOREIGN PATENT DOCUMENTS

WO     WO 95/29451     11/1995

OTHER PUBLICATIONS

Tatemura et al., "Social and Content–Based Information Filtering for a Web Graphics Recommender System," Proceedings: International Conference on Image Analysis and Processing, Venice ITALY Sep. 27–29, 1999, pp. 842–847.

Ian Clarke, et al. "A Distributed Decentralized Information Storage and Retrieval System", Division of Informatics, XP–002177459, 1999, pp. 1–43.

* cited by examiner

*Primary Examiner*—Greta Robinson
*Assistant Examiner*—Sathyanaraya R Pannala
(74) *Attorney, Agent, or Firm*—Martine & Penilla, LLP (57) ABSTRACT

A method of determining a relationship between a search item provided by a user and a plurality of objective items, wherein each objective item in the plurality includes a plurality of objective item properties and the search item includes one or more search item properties, the method comprising: grouping a subset of objective items based on an objective relationship between one or more of the plurality of objective item properties and the one or more search item properties; modifying the subset based on a subjective relationship, wherein the subjective relationship indicates an association between objective items in the subset and the search item, thereby calculating an affinity value between each objective item in the subset and the search item; and ranking the objective items in the modified subset based on the affinity value calculated.

25 Claims, 6 Drawing Sheets

SYSTEM AND METHOD FOR DETERMINING AFFINITY USING OBJECTIVE AND SUBJECTIVE DATA

BACKGROUND

1. Field of the Invention

The present invention relates generally to information retrieval techniques and more particularly to determining affinity between items using objective and subjective data.

2. Related Art

The Internet has dramatically changed the manner in which we access, gather, and collect information. Vast amounts of information are now available on-line. Various tools are available that aid users in searching this information, such as a variety of different search engines. However, it can be difficult and time consuming for on-line users to sift through the mountains of data that are available. There are many instances where users are interested in gathering information that is similar in some respect to a particular topic, but that may not lend itself to being found by a search engine. For example, users can search the Internet to find information on just about any song ever written by any artist by searching on the artist name or song title. A user may, however, be interested in finding new artists that might be similar in some respect to an artist that the user knows and enjoys. In other words, the user may be interested in finding those artists that have a high degree of affinity to the known artist. The term affinity is used herein to refer to a measure of similarity between two items. Unfortunately, known search engines are not particularly useful for such a search.

Tools are available today that allow a user to learn more about a topic of interest, where related topics are searched based on objective properties related to the topic. For example, many sites allow users to search for songs in a particular genre, or for newspaper articles having a particular search term in the headline or body of the article text. However, this type of search often produces far too many results to be useful, or results which are of minimal relevance to the sought after topic. Many of these search facilities also fail to incorporate any subjective data into the search process, such as taking into account the opinion of other users who have sought similar information in the past.

Therefore, what is needed is an improved system and method for determining affinity between items of data using both objective and subjective data.

SUMMARY OF THE INVENTION

A method of determining a relationship between a search item provided by a user and a plurality of objective items. Each objective item in the plurality includes a plurality of objective item properties and the search item includes one or more search item properties. The method comprises grouping a subset of objective items based on an objective relationship between one or more of the plurality of objective item properties and the one or more search item properties. The method comprises modifying the subset based on a subjective relationship, wherein the subjective relationship indicates an association between objective items in the subset and the search item. Thereby, an affinity value is calculated between each objective item in the subset and the search item. The method comprises ranking the objective items in the modified subset based on the affinity value calculated.

A method of determining a relationship between a search item provided by a user and a plurality of objective items. The search item includes one or more search item properties and each objective item in the plurality includes one or more objective item properties. The method comprising computing an affinity value between each of the one or more search item properties and each of the one or more objective item properties. In addition, grouping a number of objective items into an appropriate one or more clusters, wherein the number of objective items grouped have the affinity value within a predetermined distance with respect to the search item. In addition, partitioning a plurality of subjective data into one or more bins, wherein each of the one or more bins corresponds to an appropriate one or more clusters. Also, assigning a rule within each of the one or more bins, where each rule represents a user defined relationship between the objective items and the search item. Also, computing a subjective property value for each rule, wherein the subjective property indicates a strength of the user-defined relationship. In addition, adjusting the affinity value based on the subjective property value computed, thereby generating an adjusted affinity value. Updating the one or more clusters, wherein the plurality of objective items are rearranged between the one or more clusters as a result of the adjusted affinity value.

A system for retrieving information in response to a search item. The system comprises an objective database including a plurality of objective items. A subjective database having one or more rules, wherein each of the one or more rules represents a subjective relationship between one or more of the plurality of objective items and the search item. A collaborative filtering module for assigning a subjective property value to each of the one or more rules, wherein the subjective property value indicates a strength of the subjective relationship. An affinity calculation module for determining an affinity value between the search item and each of the plurality of objective items in the objective database. One or more objective items having an affinity value within a predetermined distance are initially grouped together in one or more clusters, whereby the affinity calculation module rearranges the one or more objective items in the one or more clusters upon receiving the subjective property value from the collaborative filtering module.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention is directed to a system and method for determining affinity between database items using objective and subjective data, including receiving a search item, computing an affinity between the search item and each of a plurality of items in an objective database, adjusting the affinities based on subjective data, and outputting a ranked result based on the adjusted affinities.

Figure 1:
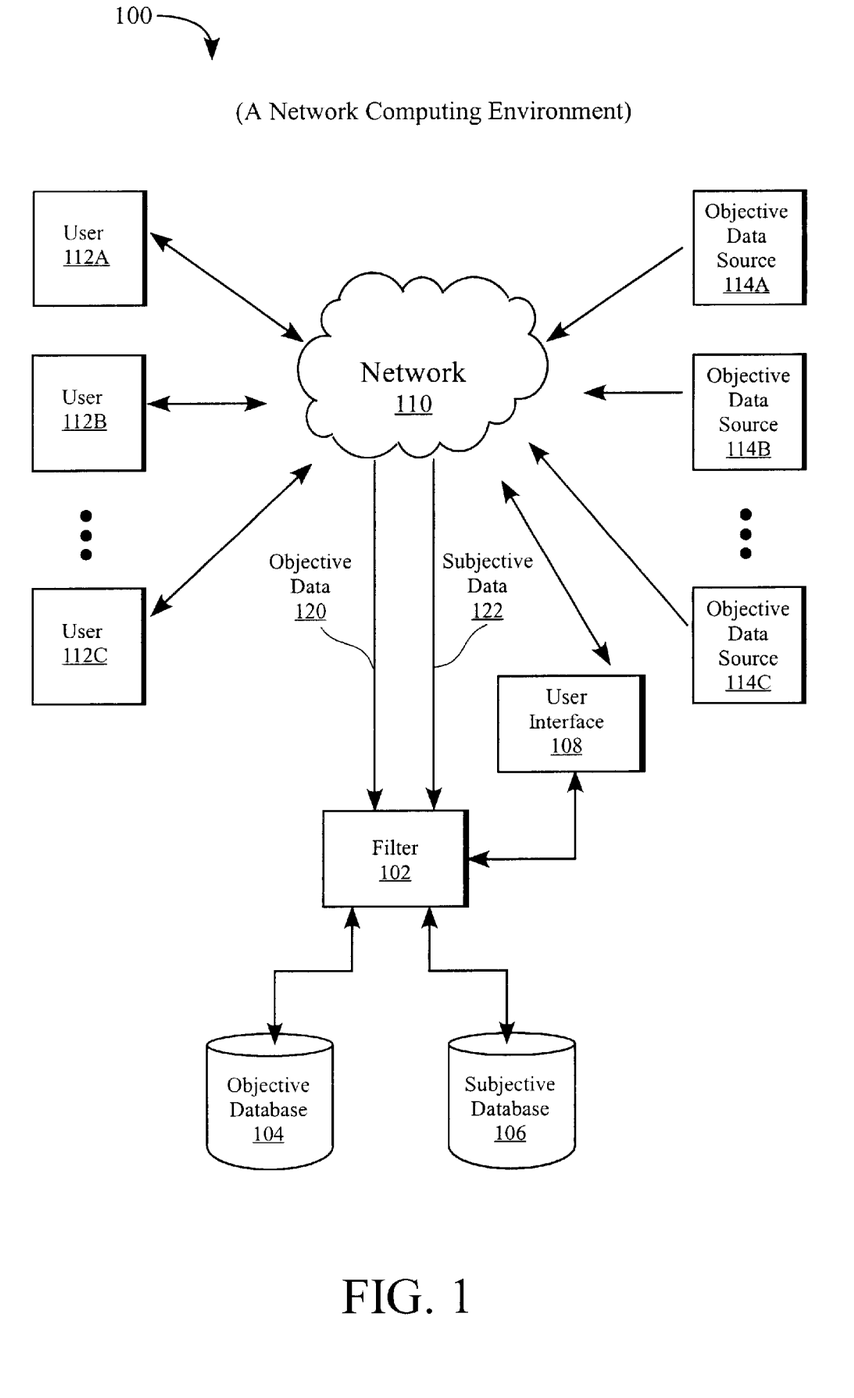
FIG. 1 illustrates a block diagram of a network computing environment of the preferred embodiment of the present invention.

FIG. 1 illustrates a network computing environment 100 within which the preferred embodiment of the present invention operates, including a network 110 that is accessed by one or more users 112 (shown as 112A, 112B, and 112C). According to the preferred embodiment of the present invention, a filter 102 determines an affinity between a search item and other items within an objective database 104, where the affinity determination uses data stored in both objective database 104 and a subjective database 106. Objective data 120 can be collected from one or more objective data sources 114 (shown as 114A, 114B, and 114C) accessible via network 110, whereas subjective data 122 can be collected from users 112. Objective data 120 and subjective data 122 can be collected by filter 102, as described below, or by separate data collection software (not shown). Users 112 interact with the filter 102 via a user interface 108. For example, users 112 can enter a search item and the resulting affinity relationships can be displayed, all via user interface 108. Filter 102 and user interface 108 can be implemented as one or more lines of computer code using any appropriate computer language.

The present invention can be applied to many different applications wherein it is advantageous to determine affinity relationships between items in objective database 104, and wherein subjective data 122 is available to relate these affinity relationships. According to the preferred embodiment, the filter 102 can be used to provide users 112 interested in music with additional information related to a favorite artist or song. For example, user 112 hears a song on the radio by an artist A1, and is interested in finding the names of other artists that are in some way similar to A1. The filter 102 can be used to determine other artists that are similar to Jane Doe, i.e., artists that have a high affinity relationship to A1 relative to other artists.

Though the preferred embodiment of the present invention is described below in terms of a music application, the principles described herein can also be applied to many other applications involving other types of data. For example, the filter 102 can be used to determine affinity relationships between many different types of media including, but not limited to, books, compact disks (CDs), digital video disks (DVDs) and newspaper articles.

Network 110 can represent any network, or two or more interconnected networks, that provides a communications pathway between users 112, objective data sources 114, and filter 102. For example, the network 110 can represent the Internet. Alternatively, network 110 can represent a wireless telecommunications network interconnected with the Internet, whereby users 112 employing mobile handheld devices access the filter 102 via a wireless connection.

Figure 2A:
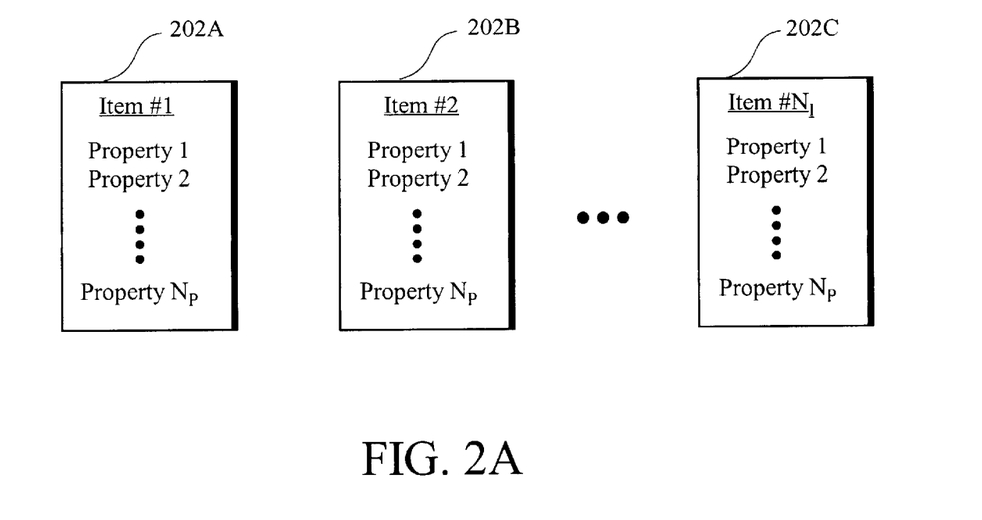
FIGS. 2A and 2B depict example items stored in an objective and subjective database, respectively.

Objective database 104 can represent any database (or multiple databases) that includes two or more items (otherwise referred to as records or entries) of a particular object class (e.g., artists, songs). Items can be described by various objective properties. FIG. 2A depicts example items 202 (shown as 202A through 202C) stored in the objective database 104 according to the preferred embodiment of the present invention. Associated with each item 202 are one or more objective properties. According to the the preferred embodiment, an artist or song can be described by the following properties: name or title (e.g., Jane Doe or "Song Title"), genre (e.g., rock, country, jazz), era (e.g., 1970's, big band), tempo (e.g., slow, fast), and popularity (e.g., number of albums sold, number of concert tickets sold). Other properties can include, but are not limited to, release date, length, energy, edginess, mood, imagery, and topic. Each property is preferably described as a quantitative value, though according to an alternative embodiment, properties can be described using textual descriptors.

According to the preferred embodiment of the present invention, objective data 120 is gathered from one or more objective data sources 114 via network 110 and used to populate the objective database 104. For example, objective data sources 114 can include, but are not limited to, record company or other third party databases, music information sources, on-line dictionaries, artist web sites and fan web sites. Objective data 120 can be gathered manually or automatically using typical web crawler technology known in the art.

Objective data 120 collected via network 110 must often be converted into a format appropriate for the objective database 104. Further, according to the preferred embodiment of the present invention, a normalization weight for each property is applied so that the relative contributions of each property to the affinity calculations described below are approximately equal. This normalization may be necessary, for example, where the range of values assigned to item properties have various magnitudes. Popularity could be expressed in terms of millions of records sold, whereas tempo could be expressed as a scalar quantity between 0 and 1. Given relatively small differences in both properties, the magnitude of a difference in popularity could vastly overshadow any difference in tempo, absent a normalization of both values. According to the preferred embodiment of the present invention, the normalization weights are chosen such that the weighted property values map down to a value between 0 and 1.

According to an alternative embodiment of the present invention, the objective database 104 can be updated periodically as new objective data 120 becomes available. The rate at which this update occurs can depend, in part, on the desired freshness of the data within the objective database 104, and on available memory and computational resources. For example, the objective database 104 might be updated weekly, daily, or even hourly, depending upon the type of data, the database size and the available resources. Objective data 120 can be saved within objective database 104 and accessed as necessary for affinity (and other) calculations, as described in greater detail below.

Figure 2B:
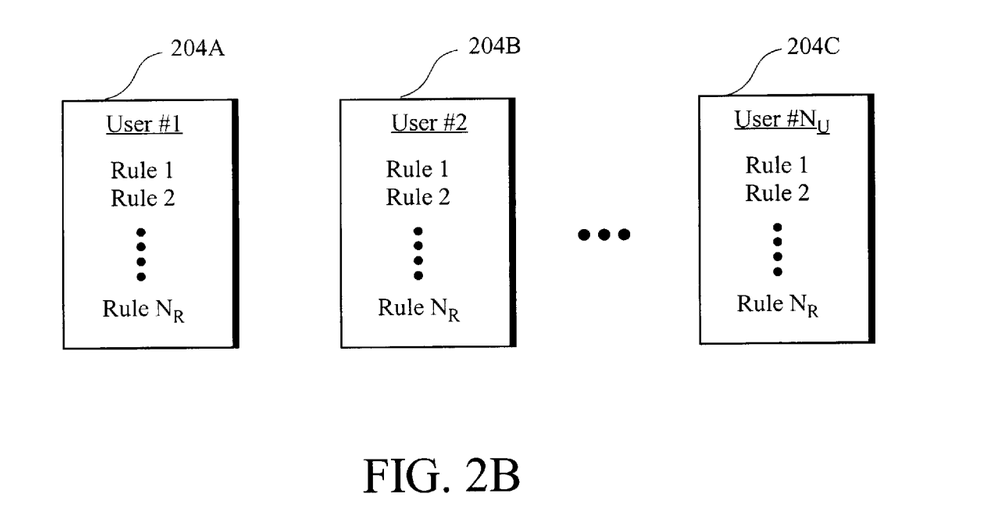

Subjective database 106 can represent any database (or multiple databases) that includes data related to the opinions or actions of users 112, where the data bears some relationship to the affinity between items 202 stored in the objective database 104. FIG. 2B depicts subjective data records 204 (shown as 204A through 204C) stored in subjective database 106 according to the preferred embodiment of the present invention. Each entry 204 corresponds to a particular user 112, and has associated with it one or more rules. A rule indicates that a user's 112 action or opinion suggests that an affinity relationship exists between two items 202 within the objective database 104.

The data used to establish rules can be provided directly by a user 112. For example, a user 112 can be asked to name artists having a particular set of properties, such as artists within a given genre and/or era. According to the preferred embodiment of the present invention, a rule can be established between each artist provided by the user indicating that, at least in the user's opinion, these artists are in some way related (i.e., there is an affinity relationship between the artists). The data used to establish rules can also be implied based on a user's actions. For example, a user browsing a web site might seek information on two or more artists sharing one or more properties. It might reasonably be inferred from the user's actions that these artists are in some way related and therefore an affinity relationship exists between them. The collection and use of subjective data 122 will be described in greater detail below.

User interface 108 can represent, for example, a graphical user interface (GUI) implemented according to well known GUI techniques to perform the input/output (I/O) functionality described herein. According to an alternative embodiment of the present invention, the user interface 108 can be implemented as described in co-pending U.S. patent application Ser. No. 60/162,465, entitled "Systems and Methods For Visualization of Data Sets Containing Objects", which is incorporated by reference herein.

Figure 3:
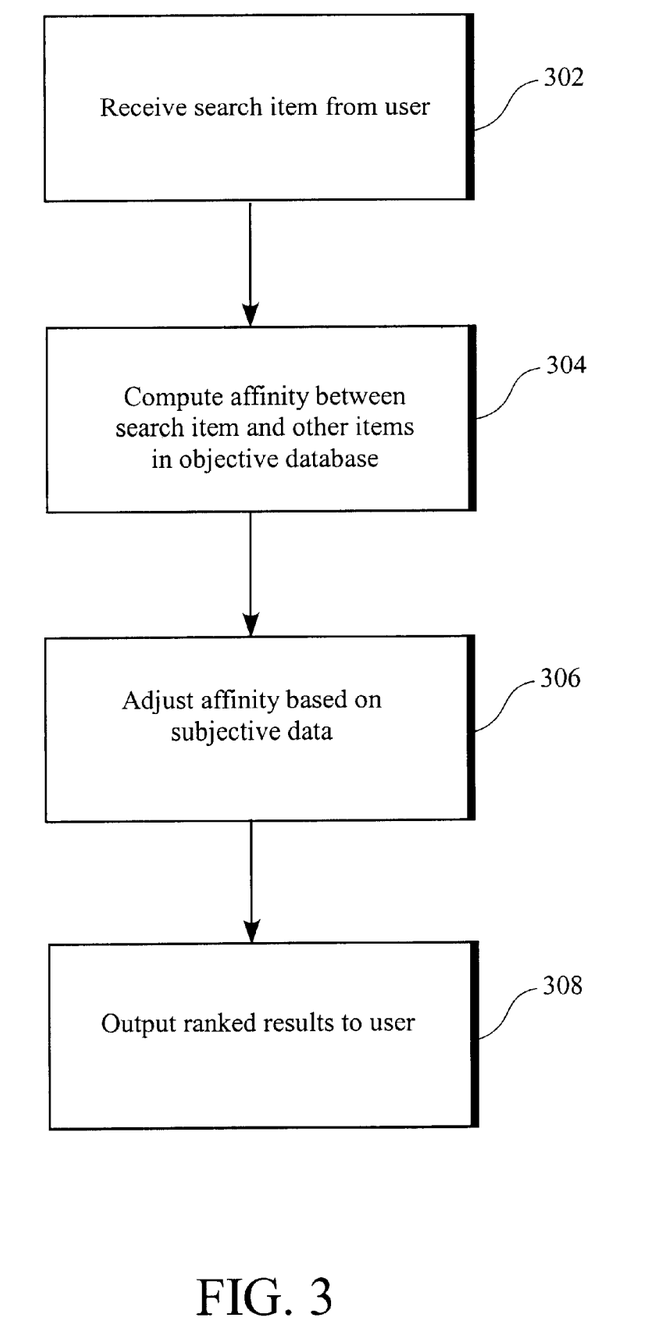
FIG. 3 illustrates a flowchart that describes determining affinity between items using objective and subjective data according to the preferred embodiment of the present invention.

FIG. 3 illustrates a flowchart that describes a process that determines affinity between database items using objective and subjective data according to the preferred embodiment of the present invention. In operation 302, a search item is received from a user 112. The search item represents an item for which user 112 wishes to find other similar items within objective database 104. For example, user 112 hears a particular song on the radio (song1), and wishes to find other similar songs. User 112 interacts with user interface 108 to input the title of song1.

According to an alternative embodiment of the present invention, a canonicalization technique (not shown) is used to normalize the search item input by the user 112. A canonical label is associated with each item within the objective database 104. A function may be defined for each class of items that can be used to provide the appropriate canonical label, given a wide variety of typical variations of the label that are often used to refer to the item. In this way, users 112 who misspell or use a shortened version of a label to refer to a particular item are mapped to the correct search item (i.e., the item intended by the user).

In operation 304, the filter 102 computes an affinity between the search item and other items within objective database 104. According to the preferred embodiment of the present invention, the filter 102 computes an affinity between the search item and each item within objective database 104 of the same object class (e.g. song, artist, etc.). For example, if the search item is a song, then the filter 102 computes an affinity between the search item and each of the other song items within the objective database 104.

Figure 4:
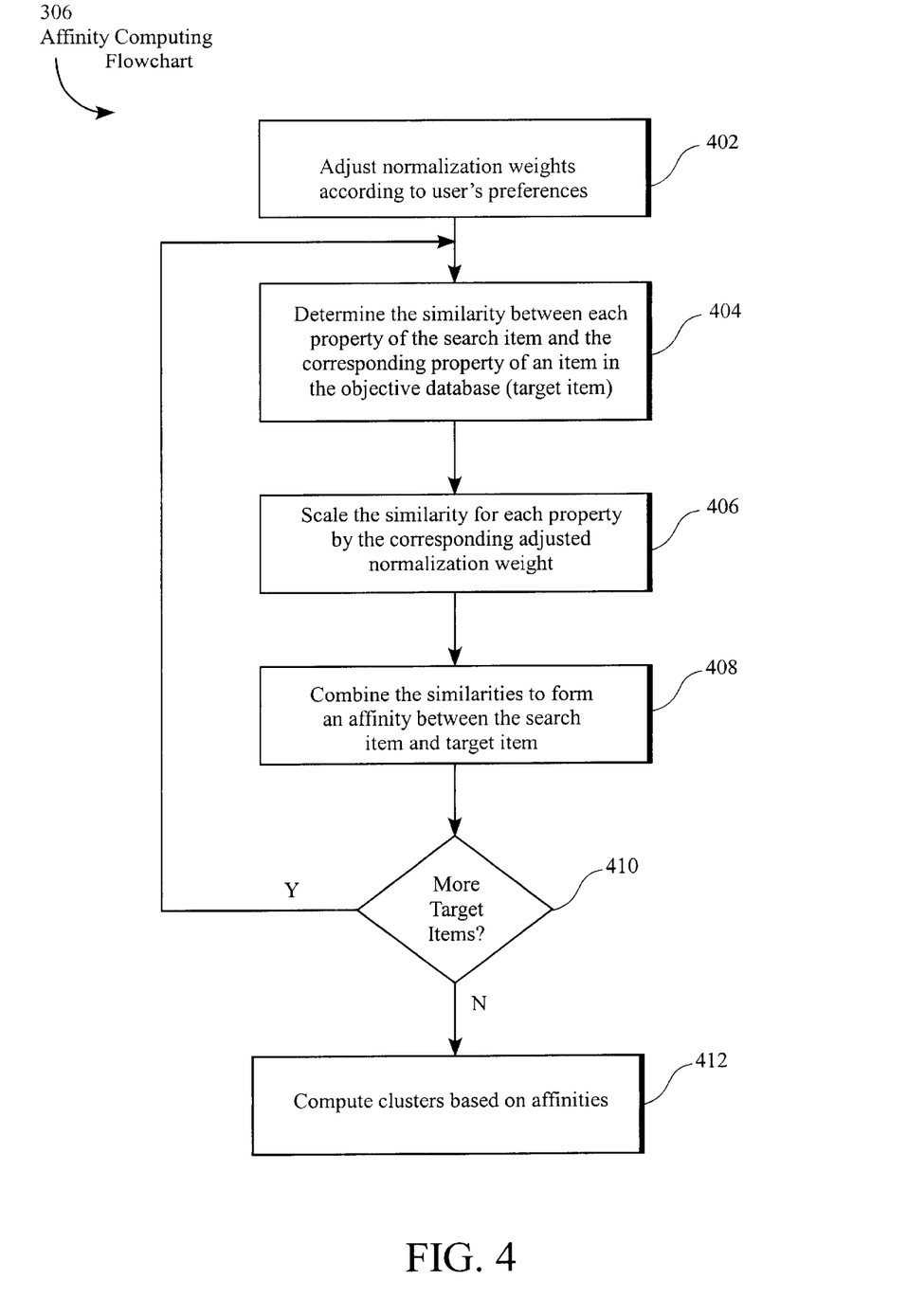
FIG. 4 illustrates a flowchart that describes in greater detail computing an affinity between a search item and other items in the objective database based on objective properties of the items according to the preferred embodiment of the present invention.

As described above, affinity represents a measure of the distance, or similarity, between two items. Affinity between two items can be calculated as the measure of the difference between the items' normalized properties. Those items that are close, i.e., have a relatively small distance between them, are considered to have a stronger affinity than those items that are further apart. FIG. 4 is a flowchart that describes operation 304 in greater detail according to embodiment of the present invention, illustrating the preferred approach to computing an affinity between a search item and other items in the objective database 104.

As described above, objective data 120 that is collected to populate the objective database 104 can, in some instances, be normalized such that each property contributes in an approximately equal manner to the affinity calculation between two items. In operation 402, which is an optional step, these normalization weights can be adjusted according to the user's preferences for altering the relative importance of certain properties with respect to the affinity calculation. For example, a user 112 enters artist1 as a search item, but wishes to specify that popularity is the most important property when determining affinity. Thus, the popularity property will contribute a larger component to the affinity calculation than the other properties.

According to the present invention, the users 112 are allowed to specify an order of relative importance between objective properties, in which the weights associated with each property are adjusted by a set amount according to their order of importance. For example, a user can specify a preferred order of importance such as genre, era, popularity, and tempo. In this case, the normalization weight associated with genre will be adjusted to reflect an increased importance, whereas the weight associated with tempo will be adjusted to reflect a decreased importance, and the weights in the middle properties, such as era and popularity will be adjusted appropriately. By predefining the user preferences in this manner, all possible orderings of the item properties can be pre-computed and stored for fast retrieval. This pre-computing can be reasonably performed for up to approximately six properties; greater than six properties can result in unrealistic computational and storage requirements.

As shown in FIG. 4, operations 404, 406, 408, and 410 are repeated for each item within objective database 104 for which an affinity value is calculated. In operation 404, the similarity is computed between each property of the search item and the corresponding property of the current item in objective database 104 for which the affinity is being calculated (the target item). According to the preferred embodiment of the present invention, the similarity between properties is calculated as the distance between the numerical property values. In operation 406, the distances calculated in operation 404 are scaled by the appropriate normalization weights (by the standard normalization weights, or if adjusted in operation 402, by the adjusted normalization weights). In operation 408, the normalized differences are combined to form an affinity measurement between the search item and the target item. These steps are then repeated to generate an affinity measurement for each target item in objective database 104.

Consider the following illustrative example. The objective database 104 includes four items (A1, A2, A3, and A4) each item having three properties (x, y, z), given by:

$$A1 = [x1, y1, z1]$$

$$A2 = [x2, y2, z2]$$

$$A3 = [x3, y3, z3]$$

$$A4 = [x4, y4, z4]$$

where x1, y1, and z1 are the values for the three properties associated with item A1, and so on through A4. Assume that user 102 enters A1 as the search item. Operations 404 through 408 can be summarized as:

$$A12 = N_x|x1-x2| + N_y|y1-y2| + N_z|z1-z2|$$

$$A13 = N_x|x1-x3| + N_y|y1-y3| + N_z|z1-z3|$$

$$A14 = N_x|x1-x4| + N_y|y1-y4| + N_z|z1-z4|$$

where A12 represents the affinity calculation between items A1 and A2, and so on for A13 and A14, where $N_x$, $N_y$, and $N_z$, represent the normalization weights for properties x, y, and z, respectively, and where $|\cdot|$ denotes an absolute value operation. As shown from the equations above, the property values for x,y,z in search item A1 are subtracted from the x,y,z property values in A2, A3, and A4. The differences of each property is the normalized by $N_x$, $N_y$, $N_z$, respectively. The values of $N_x$, $N_y$ and $N_z$ can be adjusted to achieve a weighting of properties desired by the user 112, as shown in step 402. Those skilled in the art will recognize that the distance calculation described with respect to the preferred embodiment is equivalent to calculating an L1-distance if the properties associated with each item are treated as vectors. Other distance metrics can be used to calculate affinities including, but not limited to, Euclidean (L2)-distance, and dot product (cosine)-distance.

Items A2, A3, and A4 can then be ranked in order of their affinity, from smallest (the greatest affinity to search item A1) to largest (the least affinity to search item A1). Assume for purposes of illustration that item A4 has the smallest affinity value, followed by A2 and then A3 with the highest affinity value. The initial ranking is therefore A4, A2, A3, where affinity is calculated using objective data stored in objective database 104.

In operation 412, the items within objective database 104 are clustered according to the affinities calculated in operations 404 through 410. As a result of the affinity computation performed on the items in the objective database 104, it is possible to group items according to their affinity to other items. This grouping or clustering of related items in the objective database 104 indicates which items are predisposed to have a strong affinity. However, some items will belong to more than one cluster C1,C2, . . . These clusters are used in the pre-processing of subjective data as described below. To continue the above example, assuming that after the affinity computation, A1, A2, and A4 are found to fall in one cluster C1, based on their affinity scores, while A3 and A4 fall in another, C2. Note that A4 is both in C1 and C2.

Figure 5:
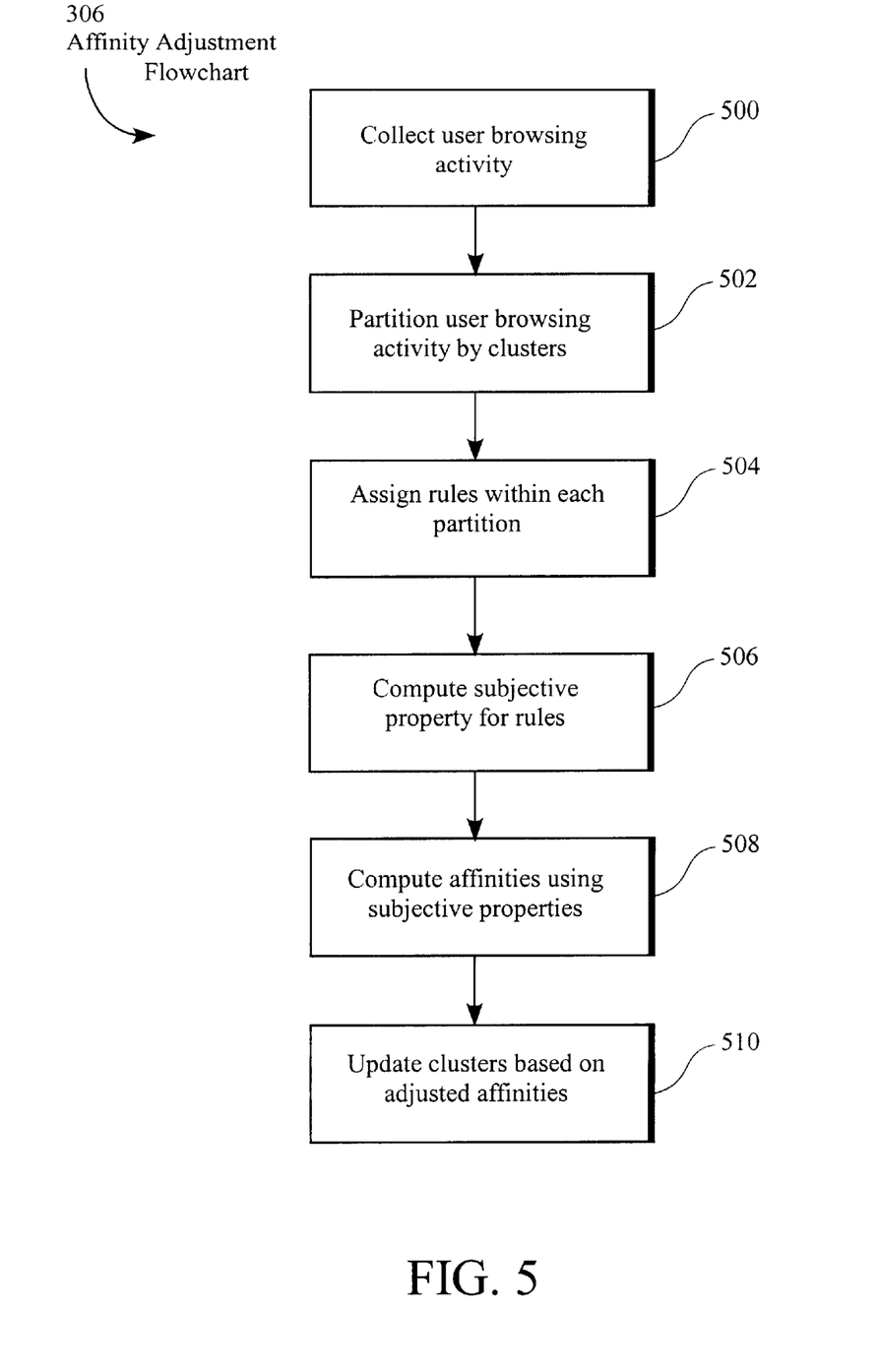
FIG. 5 illustrates a flowchart that describes in greater detail adjusting objective affinity calculations based on subjective data according to the preferred embodiment of the present invention.

Returning now to FIG. 3, in operation 306 the affinity values computed in operation 304 are adjusted based on subjective data. This type of operation is referred to within the relevant art as collaborative filtering. The collaborative filtering process allows for the injection of the subjective opinion of a consensus of users to reinforce the affinity computation and to make the results more relevant to the users' preferences. FIG. 5 is a flowchart that describes operation 306 in greater detail according to the preferred embodiment of the present invention. As described above, subjective data 122 can include data that is collected directly from users 112, such as explicitly querying users 112 to enter similar artists sharing one or more properties (e.g., "please enter your favorite jazz artists from the 1990's"). However, it is often difficult to collect statistically relevant quantities of explicitly produced data.

In contrast, significant amounts of relevant subjective data can be inferred from the actions of users 112. In operation 500, for example, user browsing activity is collected as subjective data 122. According to an alternative embodiment of the present invention, browsing activity data is categorized according to browser cookie values. As user 112 interacts with user interface 108 to request information on various items in objective database 104, browser cookie values are sent by the user's browser software along with the user's request and stored in user activity logs. Browser cookie values serve as a number identifying the active browser (user ID), the time at which the access took place, and the item requested (e.g., artist name, song title). Since the browser cookie values are constant from one session to the next, a user's browsing activity can be collected and correlated over multiple browsing sessions. The log records are sorted by user ID, with the result being separated into records (FIG. 2B) or bins corresponding to different users of the web site.

In operation 502, the subjective data gathered from their user browsing activity can be collected in operation 500 is partitioned by the clusters determined in operation 412. According to the preferred embodiment of the present invention, each individual user's requests are partitioned into bins, where each bin corresponds to a particular cluster. Since items can belong to multiple clusters, items can therefore be partitioned into multiple bins.

In operation 504, rules are assigned within each partitioned bin. According to the preferred embodiment of the present invention, the user requests within each bin partitioned in operation 502 are assumed to be potentially similar to one another, at least in the opinion of the user who made the requests. Each combination of items within the particular object class (e.g. songs, artists, etc.) are paired, thereby forming a rule which signifies the relationship between the objects in the class. For example, a bin might contain three artists (A1, A2, and A3) and four songs (S4, S5, S6, and S7). Three rules are created from three pairings of artists (R12, R13, R23, where R12 represents the rule created from pairing A1 and A2, and so on). Six rules are created from the six pairings of songs (R45, R46, R47, R56, R57, and R67, where R45 represents the rule created from pairing S4 and S5, and so on).

In operation 506, a subjective property is computed for each rule created in operation 504. According to the preferred embodiment of the present invention, the subjective property is a value that is indicative of the relative number of occurrences of a particular rule within the bins of users 112. Those rules which appear in the bins of multiple users 112 are identified as being statistically significant. A rule found in the bin of a single user 112 has little statistical significance, but when many users 112 have the same rule (i.e., the same pairs of accesses) the rule becomes a more significant indicator of popular opinion linking the two items. As they are calculated, subjective property values can be stored in a square matrix having a dimension equal to the number of items in objective database 104 (actually, only one-half of the matrix is required, since the matrix is symmetric), where each element in the matrix represents the subjective property value between item-X and item-Y.

In operation 508, the objective affinities calculated in operation 304 between the search item and other items in objective database 104 are adjusted using the subjective properties calculated in operation 506. The objective affinity calculation can be expressed as a function $AC_0(A1, A2)$ where A1, A2 are the two items for which the affinity is being calculated and $AC_0$ is the affinity calculation function. The collaborative filtering function produces rules of the form $CF_n(A1, A2)$, where n represents an integer index. According to the preferred embodiment of the present invention, the rules generated by collaborative filtering can be used to adjust the affinity calculation in operation 510 as given by:

$$AC_1(A1, A2) = f(AC_0(A1,A2)) + g(CF_0(A1,A2))$$

where $AC_1(A1, A2)$ represents the affinity calculation adjusted by the collaborative filtering component, and f and g are weighting functions that adjust the output of $AC_0$ and $CF_0$, respectively. The weighting functions f and g can be adjusted to achieve a desired balance between the objective and subjective components of the combined affinity calculation. The results of $AC_1$ are presented to users via the user interface. Further user activity is logged, allowing $CF_1$ to be computed. Further adjustments to AC, resulting in $AC_n$, are computed according to the following equation:

$$AC_n(A1,A2)=f(AC_{n-1}(A1,A2))+g(CF_{n-1}(A1,A2))+h(CF_{n-2}(A1,A2))$$

where weighting function h adjusts not the most recent collaborative filtering values from $CF_{n-1}$, but the previously computed values from $CF_{n-2}$.

Adjusting the objective affinities using collaborative filtering can change the order of the ranked results. In the example described above, the initial ranking was determined to be A4, A2, A3, using objective affinity values where A1 was the search item. However, for example, the subjective data could indicate a strong similarity between A1 and A2 (e.g., A1 and A2 share a common objective property, or many users 112 requested both A1 and A2 thereby generating a strong subjective property affinity value for Rule R12). This could impact the distance calculation to the point where A12 has a stronger affinity than A14, with the adjusted ranked result given by A2, A4, A3.

In operation 510, the clusters determined in operation 412 are updated based on the adjusted affinities calculated in operation 508. For example, referring back to the clusters C1 and C2 defined above, C1 and C2 contents may change based on the adjusted affinities. C1 and C2 were determined after the initial affinity computation described above was performed. After incorporating the collaborative filtering adjustments to the affinity scores, it was found that A1 and A2 still belong to C1, while A4 no longer does. Similarly, A2 now also belongs to C2, alongside A3, and A4, which were the original members of C2. Thus, the adjustment of clusters can signify that artist A4 is no longer considered to be similar to A1, while artist A2 is more similar to A3 than before.

According to an alternative embodiment of the present invention, operations 500 through 506 can be performed "off-line" rather than being performed with each new search item. Also, subjective data 122 can be collected and processed into subjective properties for rules on a periodic basis, as new subjective data become available, and stored in subjective database 106. For example, the user activity logs can be queried at the end of each day, and the subjective properties can be updated based on the new information.

Further, according to an alternative embodiment of the present invention, subjective data 122 over a given window of time is used to calculate subjective properties, rather than using all available subjective data. By shortening this time window, the subjective properties can be more reflective of user opinions at a particular moment or period in time, though the calculation may be somewhat less statistically reliable depending on the amount of data available for the collaborative filtering process. For example, user opinion shifts fairly rapidly over time regarding which artists or songs are in vogue, and whether particular songs or artists are considered similar to one another. The length of the time window can therefore be varied to trade-off statistical reliability of response time with changing user opinion. In order to maintain continuity with prior filtering results, the prior results, when available, can be incorporated into the affinity calculations as a second separate subjective measure alongside the most recent results. However, the prior results would be weighted with a reduced weighting factor. This technique is related to cache aging techniques pioneered for networking protocols. The filtering result aging strategy permits the gradual introduction of new items into the user interface and prevents the sudden disappearance of previously existing content.

The computational and memory requirements associated with the subjective processing represented by operations 500 through 508 can be reduced without significant reduction in the accuracy of the processing. According to an alternative embodiment of the present invention, only those items in objective database 104 having an objective affinity value greater than a given threshold are put through subjective processing. Eliminating those items below the affinity threshold will eliminate statistical outliers, items which are unlikely to be similar to the search item, but which can significantly reduce computational and memory burdens. According to an alternative embodiment, only the objective items having the strongest affinity calculations are put through subjective processing. This can have a similar effect to applying an affinity threshold, but may be less reliable since the objective items having the strongest affinity can vary tremendously in precision from one item to another.

Further, according to another alternative embodiment of the present invention, various techniques can be used to pre-select those users 112 who are more likely to request similar items, i.e., are more likely to share common rules in determining affinity. Subjective properties are therefore only calculated between users 112 that have been pre-selected as being more likely to request similar items. As a result, the processing and memory requirements associated with subjective processing can be greatly decreased without significantly impacting the reliability of the subjective properties, because those users 112 eliminated from the calculation are less likely affect the rankings of the objective items. These techniques can include, but are not limited to, min-hashing algorithms and iceberg algorithms. By using these techniques, the present invention can scalably handle larger amounts of data by using stringent pre-selection criteria, thereby limiting the number of users 112 for which subjective properties are calculated.

Figure 6:
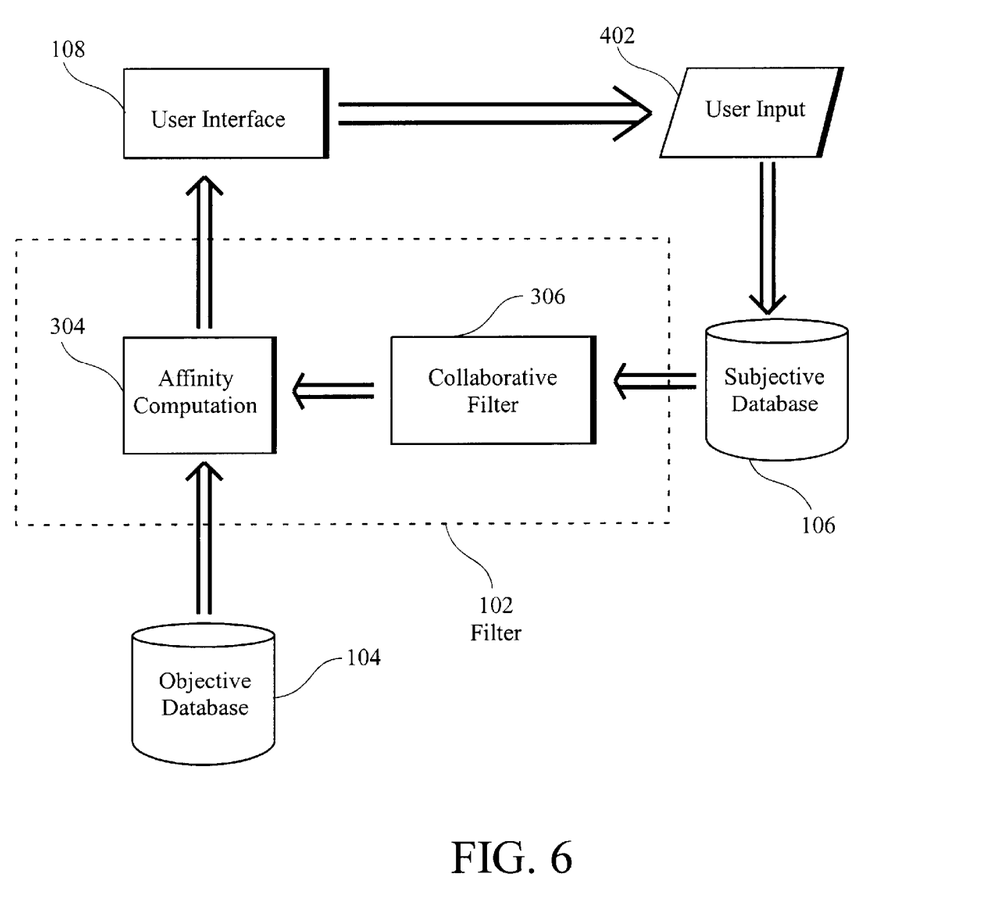
FIG. 6 illustrates a data flow diagram of the iterative nature of determining affinity between items according to the preferred embodiment of the present invention.

FIG. 6 is a data flow diagram that illustrates the iterative nature of determining affinity between database items according to the preferred embodiment of the present invention. The affinity computation represented by operation 304 in FIG. 3 uses objective data from objective database 104 to generate an initial objective affinity calculation for the search item. The results of the affinity calculation are presented to the user via user interface 108, for example, as a list of similar items ranked according to their affinity to the search item. The user can then select one or more of the similar items for additional searching, and the browsing results would then be stored in the subjective database 106. The user can thereby potentially create a rule between the search item and the selected similar item as a result of selecting the similar item. If a significant number of users 112 also select the similar item, this can result in the affinity between the two items being increased as a result of the collaborative filtering operation represented by operation 306.

By using an affinity threshold to eliminate outliers, the affinity computation can effectively make the collaborative filtering computation more efficient, whereas the collaborative filtering computation can increase the relevance of the results that the affinity computation produces. With each iteration of the loop depicted in FIG. 6, this mutually reinforcing process produces ever more efficient and relevant affinity calculations as more current subjective and objective data become available.

While the present invention has been described in terms of a preferred embodiment, other embodiments and variations are within the scope of the following claims. The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modification s may be made in the embodiment chosen for illustration without departing from the spirit and scope of the invention

What is claimed is:

1. A method of determining a relationship between a search item provided by a user and a plurality of objective items, wherein each objective item in the plurality includes a plurality of objective item properties and the search item includes one or more search item properties, the method comprising:
   a. grouping a subset of objective items based on an objective relationship between one or more of the plurality of objective item properties and the one or more search item properties;
   b. modifying the subset based on a subjective relationship, wherein the subjective relationship indicates an association between objective items in the subset and the search item, thereby calculating an affinity value between each objective item in the subset and the search item, and wherein subjective data of the subjective relationship is stored in a subjective database;
   c. ranking the objective items in the modified subset based on the affinity value calculated; and
   d. scaling the affinity value computed by one or more predetermined normalization weights, wherein the one or more predetermined normalization weights are initially set by the user.

2. The method according to claim 1 further comprising computing one or more subjective property values based on subjective data collected, wherein the one or more subjective property values indicate a strength of the association between the plurality of objective items and the search item.

3. The method according to claim 2 further comprising adjusting the affinity value based on the one or more subjective property values computed.

4. A method according to claim 1 further comprising providing the user with the objective items in the modified first subset.

5. The method according to claim 4 wherein the ranked order of objective items provided to the user is displayed via a user interface.

6. The method according to claim 1 wherein the plurality of objective items are stored in an objective database.

7. The method according to claim 6 further comprising updating the subset of objective items as a new objective item is added to the objective database.

8. The method according to claim 2 wherein the subjective data is collected based on user browsing activity over a predetermined period of time.

9. The method according to claim 2 wherein the subjective data is provided directly by the user.

10. A method of determining a relationship between a search item provided by a user and a plurality of objective items, wherein each objective item in the plurality includes a plurality of objective item properties and the search item includes one or more search item properties, the method comprising:
   a. grouping a subset of objective items based on an objective relationship between one or more of the plurality of objective item properties and the one or more search item properties;
   b. modifying the subset based on a subjective relationship, wherein the subjective relationship indicates an association between objective items in the subset and the search item, thereby calculating an affinity value between each objective item in the subset and the search item, and wherein the subset of objective items is modified by a cache aging technique;
   c. ranking the objective items in the modified subset based on the affinity value calculated; and
   d. scaling the affinity value computed by one or more predetermined normalization weights, wherein the one or more predetermined normalization weights are initially set by the user.

11. A method of determining a relationship between a search item provided by a user and a plurality of objective items, wherein each objective item in the plurality includes a plurality of objective item properties and the search item includes one or more search item properties, the method comprising:
   a. grouping a subset of objective items based on an objective relationship between one or more of the plurality of objective item properties and the one or more search item properties;
   b. modifying the subset based on a subjective relationship, wherein the subjective relationship indicates an association between objective items in the subset and the search item, thereby calculating an affinity value between each objective item in the subset and the search item, the affinity value being s calculated by taking a difference between the one or more search item properties and each of the plurality of objective item properties;
   c. computing one or more subjective property values based on subjective data collected, wherein the one or more subjective property values indicate a strength of the association between the plurality of objective items and the search item;
   d. ranking the objective items in the modified subset based on the affinity value calculated; and
   e. scaling the affinity value computed by one or more predetermined normalization weights, wherein the one or more predetermined normalization weights are initially set by the user.

12. A method of determining a relationship between a search item provided by a user and a plurality of objective items, wherein each objective item in the plurality includes a plurality of objective item properties and the search item includes one or more search item properties, the method comprising:
   a. grouping a subset of objective items based on an objective relationship between one or more of the plurality of objective item properties and the one or more search item properties;
   b. modifying the subset based on a subjective relationship, wherein the subjective relationship indicates an association between objective items in the subset and the search item, thereby calculating an affinity value between each objective item in the subset and the search item;
   c. ranking the objective items in the modified subset based on the affinity value calculated; and d. scaling the affinity value computed by one or more predetermined normalization weights, wherein the one or more predetermined normalization weights are initially set by the user.
wherein the subset of objective items is updated using an equation:

$$AC\ j(As,Ao)=f[AC\ n-i(As,Ao)]+g[CFn-i(As,Ao)]+h[Cfn-z\{As,Ao\}]$$

where AC is an affinity calculation, CF is a collaborative filtering function, As is the search item, Ao is one of the plurality of objective items, further wherein f, g and h are each a weighting function and n is an integer.

13. A method of determining a relationship between a search item provided by a user and a plurality of objective items, wherein the search item includes one or more search item properties and each objective item in the plurality includes one or more objective item properties, the method comprising:
  a. computing an affinity value between each of the one or more search item properties and each of the one or more objective item properties;
  b. grouping a number of objective items into an appropriate one or more clusters, wherein the number of objective items grouped have the affinity value within a predetermined distance with respect to the search item;
  c. partitioning a plurality of subjective data into one or more bins, wherein each of the one or more bins corresponds to an appropriate one or more clusters;
  d. assigning a rule within each of the one or more bins, each rule representing a user defined relationship between the objective items and the search item;
  e. computing a subjective property value for each rule, wherein the subjective property indicates a strength of the user-defined relationship;
  f. adjusting the affinity value based on the subjective property value computed, thereby generating an adjusted affinity value; and
  g. updating the one or more clusters, wherein the plurality of objective items are rearranged between the one or more clusters as a result of the adjusted affinity value.

14. The method according to claim 13 further comprising scaling the affinity value computed by one or more predetermined normalization weights.

15. The method according to claim 14 wherein the one or more predetermined normalization weights are initially set by the user.

16. The method according to claim 13 further comprising providing the plurality of objective items in the updated one or more clusters to the user in a ranked order based on the adjusted affinity value of each objective item.

17. The method according to claim 16 wherein the ranked order provided to the user is displayed via a user interface.

18. The method according to claim 13 wherein the plurality of objective items are stored in an objective database.

19. The method according to claim 13 wherein the plurality of subjective data are stored in a subjective database.

20. The method according to claim 18 further comprising updating the one or more clusters as a new objective item is added to the objective database.

21. The method according to claim 13 wherein the affinity value is calculated by taking a difference between the one or more search item properties and the one or more objective item properties.

22. The method according to claim 13 wherein the affinity value is adjusted using an equation:

$$AC\ n(As,Ao)=f[AC\ n-1(As,Ao)]+g[CFn-1(As,Ao)]+h[Cfn-iAs,Ao)]$$

where AC is an affinity calculation, CF is a collaborative filtering function, As is the search item, Ao is one of the plurality of objective items, further wherein f, g and h are each a weighting function and n is an integer.

23. A system for retrieving information in response to a search item, the system comprising:
  a. an objective database including a plurality of objective items;
  b. a subjective database having one or more rules, wherein each of the one or more rules represents a subjective relationship between one or more of the plurality of objective items and the search item;
  c. a collaborative filtering module for assigning a subjective property value to each of the one or more rules, wherein the subjective property value indicates a strength of the subjective relationship; and
  d. an affinity calculation module for determining an affinity value between the search item and each of the plurality of objective items in the objective database, wherein one or more objective items having an affinity value within a predetermined distance are initially grouped together in one or more clusters, whereby the affinity calculation module rearranges the one or more objective items in the one or more clusters upon receiving the subjective property value from the collaborative filtering module.

24. The system according to claim 23 wherein the affinity calculation module determines the affinity value between the search item and each of the objective items by taking a difference between one or more search item properties and one or more objective item properties.

25. The system according to claim 23 wherein the affinity calculation module rearranges the one or more objective items by computing an equation:

$$AC\ n(As,Ao)=f[AC\ n-i(As,Ao)]+g[CFn-i(As,Ao)]+h[Cfn-2(As,Ao)]$$

where AC is an affinity calculation, CF is a collaborative filtering component, As is the search item, Ao is one of the plurality of objective items, further wherein f, g and h are each a weighting function and n is an integer.

* * * * *